*Thompson & Dalrymple;*
*Drag Saw.*

N° 36,246. Patented Aug. 19, 1862.

Witnesses
J. W. Coombs
M. M. Livingston

Inventor
J. Thompson
D. F. Dalrymple
per Munn & Co.
Attorneys

UNITED STATES PATENT OFFICE.

J. THOMPSON AND D. D. DALRYMPLE, OF CROSS ROADS, OHIO.

SAWING-MACHINE.

Specification of Letters Patent No. 36,246, dated August 19, 1862.

*To all whom it may concern:*

Be it known that we, J. THOMPSON and D. D. DALRYMPLE, both of Cross Roads, in the county of Jackson and State of Ohio, have invented a new and Improved Sawing-Machine; and we do hereby declare that the following is a full, clear, and exact description of the same, reference being had to the accompanying drawing, forming a part of this specification, in which—

Figure 2:
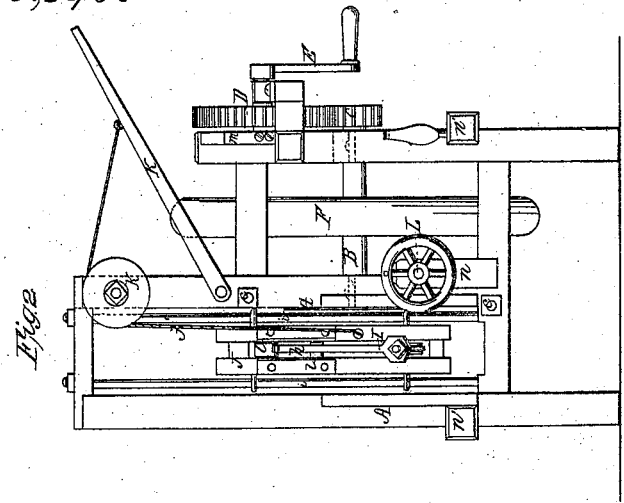
Figure 1:
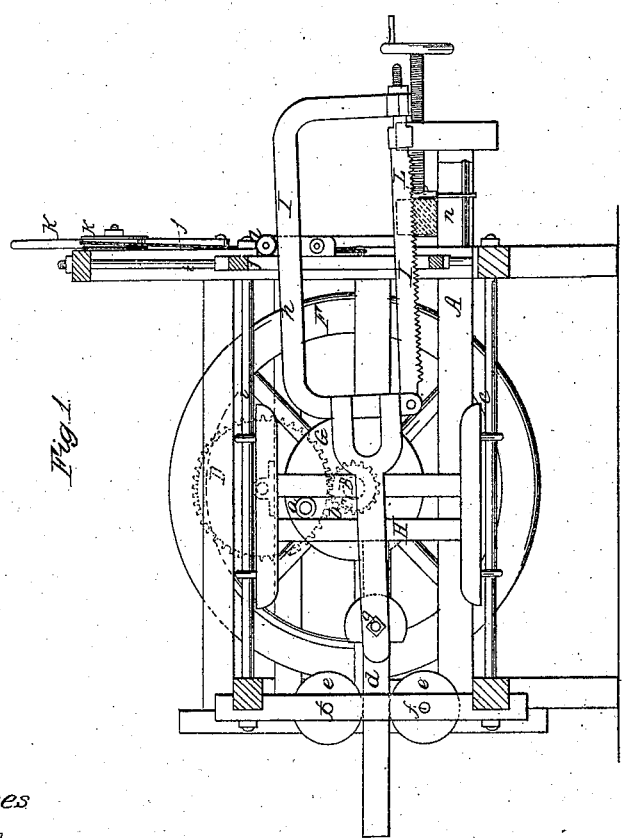

Figure 1: represents a longitudinal vertical section of our invention. Fig. 2: is an end elevation of the same.

Similar figures of reference in both views indicate corresponding parts.

To enable those skilled in the art to make and use our invention we will proceed to describe its construction and operation with reference to the drawings.

The frame A, to which all the working parts of our sawing machine are attached is made of wood or any other suitable material, and it forms the bearings for the mainshaft B, to which a rotary motion is imparted by gear wheels C, D, and a crank E, or in any other convenient manner. A flywheel F, secured to the mainshaft B, facilitates the operation. To the end of said shaft a disk G, is rigidly attached and an eccentric roller pin $a$, inserted into the face of this disk projects into a slot $b$, in the gate H, which serves to impart motion to the saw I. The gate is hung on horizontal rods $c$, and its shank $d$, is guided by rollers $e$, which rotate on arbors $f$, in one end of the frame A. The saw I, is secured to the gate H, by means of a pivot $g$, so that the motion of the gate is communicated to the saw and at the same time the latter is permitted to turn up and down in a vertical plane. The bow $h$, of the saw is guided by a frame J, which is hung upon vertical rods $i$, and which can be raised or lowered by a rope or chain $j$, passing over a pulley $k$, and being secured to a hand lever K. Rollers $l$, inserted into the frame J, above and below the bow $h$, of the saw facilitate the motion of the latter when the frame bears down upon the saw or when the saw is raised. If it is desired to raise the saw clear up, the hand lever is depressed until it is retained by the spring catch $m$.

The wood to be cut is supported by the projected ends of the longitudinal timbers $n$, $n$, of the frame A, and it (the wood) is retained by a screw clamp L, as clearly shown in Fig. 1, of the drawing where the log is indicated by red outlines. After the wood has been fixed in the proper place the hand lever K, is released from the spring catch $m$, and the saw is let down gradually until it begins to cut. When fully started the weight of the frame J, is permitted to bear on the saw so that the operation of cutting the wood progresses quite rapidly. After one cut is finished the saw is raised by means of the frame J, without stopping the motion of the shaft B, the log or wood to be cut is shifted forward and readjusted and fastened by the screw clamp L, and the second cut is now accomplished precisely in the same manner as the first. By these means a large quantity of wood can be cut in a comparatively short time and with less exertion than by hand or by other sawing machines heretofore used for this purpose.

We do not claim broadly, the driving of a grooved reciprocating frame by means of a wrist-pin, attached to a rotating wheel; but

Having thus described our invention, we claim as new and desire to secure by Letters Patent—

The combination of the frame J, rollers $l$, $l$, and clamp L, with the pivoted saw I, bow $h$, shank $d$, rollers $e$, $e$, gate H, disk G, and wheel F, the whole operating together in the manner herein shown and described.

J. THOMPSON.
D. D. DALRYMPLE.

Witnesses:
WM. J. EVANS,
MICHAEL DECKERT.